United States Patent
Ramasubramanian et al.

(10) Patent No.: US 8,524,395 B2
(45) Date of Patent: *Sep. 3, 2013

(54) NONAQUEOUS ELECTROLYTE SECONDARY BATTERY ANODE MATERIAL WITH A UNIFORM METAL-SEMICONDUCTOR ALLOY LAYER

(75) Inventors: Murali Ramasubramanian, Fremont, CA (US); Robert Spotnitz, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/396,958

(22) Filed: Feb. 15, 2012

(65) Prior Publication Data
US 2012/0177993 A1    Jul. 12, 2012

Related U.S. Application Data

(62) Division of application No. 12/105,090, filed on Apr. 17, 2008, now Pat. No. 8,133,613.

(51) Int. Cl.
*H01M 4/13* (2010.01)
*H01M 4/62* (2006.01)
*H01M 4/02* (2006.01)
*H01B 1/02* (2006.01)
*H01M 4/70* (2006.01)
*H01M 2/02* (2006.01)
*H01L 21/31* (2006.01)
*C04B 35/64* (2006.01)

(52) U.S. Cl.
USPC ........ 429/218.1; 429/168; 429/223; 429/224; 429/231.1; 429/232; 429/209; 429/623.1; 429/234; 429/239; 438/765; 438/769; 252/62.59; 252/521.3

(58) Field of Classification Search
USPC ........... 429/218.1, 223, 224, 168, 232, 231.1, 429/234, 209, 239, 623.1
See application file for complete search history.

(56) References Cited

U.S. PATENT DOCUMENTS 6,090,505 A * 7/2000 Shimamura et al. ....... 429/218.1
6,235,427 B1 * 5/2001 Idota et al. ................. 429/218.1
(Continued)

FOREIGN PATENT DOCUMENTS

EP    0883199 A1    12/1998
EP    1028476 A1    8/2000
(Continued)

OTHER PUBLICATIONS

Golodnitsky et al., "Advanced Materials for the 3D microbattery," Journal of Power Sources 153 (2006), pp. 281-287.*
(Continued)

*Primary Examiner* — Bobby Ramdhanie
*Assistant Examiner* — Jennifer Wecker
(74) *Attorney, Agent, or Firm* — Bryan Cave LLP

(57) ABSTRACT

The present invention relates to nonaqueous electrolyte secondary batteries and durable anode materials and anodes for use in nonaqueous electrolyte secondary batteries. The present invention also relates to methods for producing these anode materials. In the present invention, a metal-semiconductor alloy layer is formed on an anode material by contacting a portion of the anode material with a displacement solution. The displacement solution contains ions of the metal to be deposited and a dissolution component for dissolving a part of the semiconductor in the anode material. When the anode material is contacted with the displacement solution, the dissolution component dissolves a part of the semiconductor in the anode material thereby providing electrons to reduce the metal ions and deposit the metal on the anode material. After deposition, the anode material and metal are annealed to form a uniform metal-semiconductor alloy layer.

11 Claims, 2 Drawing Sheets

(56) References Cited

U.S. PATENT DOCUMENTS

| | | | |
|---|---|---|---|
| 6,525,391 | B1 | 2/2003 | Bertrand et al. |
| 2004/0234861 | A1 | 11/2004 | Kawase et al. |
| 2005/0095503 | A1 | 5/2005 | Adachi et al. |
| 2005/0130383 | A1* | 6/2005 | Divakaruni et al. .......... 438/384 |
| 2009/0263716 | A1 | 10/2009 | Ramasubramanian et al. |

FOREIGN PATENT DOCUMENTS

| | | |
|---|---|---|
| EP | 1100134 A1 | 5/2001 |
| EP | 1102340 A2 | 5/2001 |

OTHER PUBLICATIONS

Broussely, M. et al., Li-ion batteries and portable power source prospects for the next 5-10 years, Journal of Power Sources, 2004, 136, 386-394.

Harraz, F. A. et al., Immersion plating of nickel onto a porous silicon layer from fluoride solutions, Phys. Stat. Sol. (A), 2003, 197 (1), 51-56.

Harraz, F. A. et al., Different Behavior in Immersion Plating of Nickel on Porous Silicon from Acidic and Alkaline Fluoride Media, Journal of The Electrochemical Society, 2003, 150 (5), C277-C284.

Obrovac, M. N. et al., Reversible Cycling of Crystalline Silicon Powder, Journal of The Electrochemical Society, 2007, 54 (2), A103-A108.

Waidmann, S. et al., Tuning nickel silicide properties using a lamp based RTA, a heat conduction based RTA or a furnace anneal, Microelectronic Engineering 83, 2006, 2282-2286.

Xu, C. et al., Nickel Displacement Deposition of Porous Silicon with Ultrahigh Aspect Ratio, Journal of The Electrochemical Society, 2007, 154 (3), D170-D174.

Zhang, X. et al., High Aspect Ratio Nickel Structures Fabricated by Electrochemical Replication of Hydrofluoric Acid Etched Silicon, Electrochemical and Solid-State Letters, 2006, 9 (9), C150-C152.

International Search Report for PCT/US2009/041012, mailed Sep. 8, 2009.

\* cited by examiner

NONAQUEOUS ELECTROLYTE SECONDARY BATTERY ANODE MATERIAL WITH A UNIFORM METAL-SEMICONDUCTOR ALLOY LAYER

CROSS-REFERENCE TO RELATED APPLICATIONS

This application is a divisional of application Ser. No. 12/105,090, filed Apr. 17, 2008, which is incorporated by reference herein in its entirety.

FIELD OF THE INVENTION

The present invention relates to nonaqueous electrolyte secondary batteries and relates specifically to more efficient and durable anode materials for use in nonaqueous electrolyte secondary batteries as well as methods for producing these anode materials.

BACKGROUND OF THE INVENTION

Nonaqueous electrolyte secondary batteries are a type of rechargeable battery in which ions move between the anode and cathode through a nonaqueous electrolyte. Nonaqueous electrolyte secondary batteries include lithium-ion, sodium-ion, and potassium-ion batters as well as other battery types.

Lithium-ion batteries are a popular type of nonaqueous electrolyte secondary battery in which lithium ions move between the cathode and the anode thought the electrolyte. The benefits and the challenges of lithium-ion batteries are exemplary of the benefits and challenges of other nonaqueous electrolyte secondary batteries; the following examples pertaining to lithium-ion batteries are illustrative and are not limiting. In lithium-ion batteries, the lithium ions move from the anode to the cathode during discharge and from the cathode to the anode when charging. Lithium-ion batteries are highly desirable energy sources due to their high energy density, high power, and long shelf life. Lithium-ion batteries are commonly used in consumer electronics and are currently one of the most popular types of battery for portable electronics because they have high energy-to-weight ratios, no memory effect, and a slow loss of charge when not in use. Lithium-ion batteries are growing in popularity for in a wide range of applications including automotive, military, and aerospace applications because of these advantages.

FIG. 1 is a cross section of a prior art lithium-ion battery. The battery 15 has a cathode current collector 10 on top of which a cathode 11 is assembled. The cathode current collector 10 is covered by a separator 12 over which an assembly of the anode current collector 13 and the anode 14 is placed. The separator 12 is filled with an electrolyte that can transport ions between the anode and the cathode. The current collectors 10, 13 are used to collect the electrical energy generated by the battery 15 and connect it to an outside device so that the outside device can be electrically powered and to carry electrical energy to the battery during recharging.

Anodes of nonaqueous electrolyte secondary batteries can be made from composite or monolithic anode materials. In composite anodes, particulate anode material is physically bound together with a binder forming a matrix of the particles and the binder. For example, anodes can be made from carbonaceous particles bound with a polymer binder. Monolithic anodes are anodes that are not made by the addition of a physical binder material. For example, any method of creating of a silicon anode where the silicon molecules are interconnected without the aid of an external binding agent is a monolithic film. Examples of monolithic anode materials include monocrystalline silicon, polycrystalline silicon and amorphous silicon. Monolithic anodes can also be formed by melting or sintering particles of anode material or by vacuum and chemical deposition.

During the charging process of the lithium-ion battery, the lithium leaves the cathode and travels through the electrolyte in the separator as a lithium ion and into the anode. During the discharge process, the lithium ion leaves the anode material, travels through the electrolyte in the separator and passes through to the cathode. Elements like aluminum, silicon, germanium and tin react with lithium ions and are used in high-capacity anodes. Anode materials that react with lithium have active areas in which lithium can react and inactive areas in which lithium cannot react. The ratio of the active to inactive area of the anode affects the efficiency of the battery.

In the reaction of lithium ions in a lithium-reactive material, there is a significant volume difference between the reacted and extracted states; the reacted state of lithium-reactive anode materials occupies significantly more volume than the extracted state. Therefore, the anode changes volume by a significant fraction during every charge-discharge cycle. In lithium-reactive anodes, cracks in the anode material are often formed during the cycling volume change. With repeated cycling, these cracks can propagate and cause parts of the anode material to separate from the anode. The separation of portions of the anode from cycling is known as exfoliation. Exfoliation causes a decrease in the amount of active anode material that is electrically connected to the current collector of the battery, thereby causing capacity loss.

Silicon anodes, which are excellent candidates for lithium-ion batteries due to silicon's high capacity for lithium, suffer from significant capacity degradation due to cycling exfoliation. Reducing the charged-to-discharged voltage window applied to a silicon anode in a lithium-ion battery can stem the capacity loss due to cycling since the expansion and contraction are a function of the state of charge. But reducing the charged-to-discharged voltage window lowers the operating capacity of the battery. Also, silicon is a poor conductor and must often be formulated with conductive additives to function as an anode material. These conductive additives reduce the active to inactive ratio, thereby reducing the energy density of the battery. Conductive additives are typically materials like carbon black that are added to the anode particles and mixed before binding the particles.

Another method to improve conductivity of an anode material is to deposit a layer of conductive material on an anode material. Methods for deposition of conductive layers include vapor deposition, electro-deposition, and electroless deposition. When materials are deposited using any of the above methodologies on resistive substrates like silicon, the deposition across the anode is typically non-uniform. For example, in electroless plating and electroplating of metals such as nickel, the deposition rate on a nickel surface is significantly higher than that on a dissimilar surface such as silicon. A deposition that has such significant kinetic variations on different materials causes the deposition to have surface defects, pores, and areas of no deposition. In the case of a line of sight deposition processes like vacuum deposition from a target, non-planar surfaces with areas that are not in direct line of sight get significantly less or no deposition thereby reducing thickness uniformity. In addition, these coatings may not adhere well since these coating methods have poor adhesion strength of the deposited metal to semiconductor material. The poor adhesion strength, poor uniformity, and poor minimum thickness of these coatings result in poor cycle life, power, energy, and reliability.

SUMMARY OF THE INVENTION

The present invention relates to nonaqueous electrolyte secondary batteries and durable anode materials and anodes for use in nonaqueous electrolyte secondary batteries. The present invention also relates to methods for producing these anode materials. In the present invention, a layer of metal-semiconductor alloy is formed on an anode material by contacting a portion of the anode material with a displacement solution. The displacement solution contains ions of the metal to be deposited and a dissolution component for dissolving a part of the semiconductor in the anode material. When the anode material is contacted with the displacement solution, the dissolution component dissolves a part of the semiconductor in the anode material thereby providing electrons to reduce the metal ions and deposit the metal on the anode material. After deposition, the anode material and metal are annealed to form a uniform metal-semiconductor alloy layer.

DETAILED DESCRIPTION OF THE INVENTION

Figure 1:
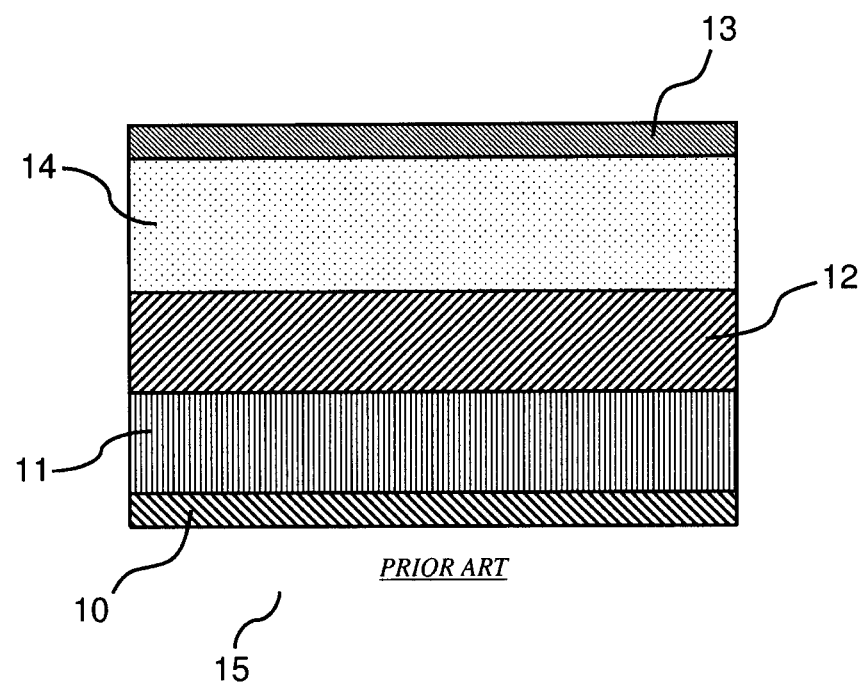
FIG. 1 is a cross section of a prior art lithium-ion battery.

The inventors of the present invention have discovered that using a displacement plating process to coat metal on a semiconductor-containing anode material followed by annealing results in thin and uniform metal-semiconductor alloy coating for improved conductivity and reduced anode expansion without a substantial loss in efficiency.

The uniform metal-semiconductor alloy coatings of the present invention provide significantly better electrical conductivity than the native semiconductor structure of the anode itself. For example, typical silicon powder has a resistivity of 1-100 Ω/cm; whereas a nickel silicide layer of composition NiSi has a resistivity of 10-60 μΩ/cm. This provides an enormous advantage for use in a nonaqueous electrolyte secondary battery, such as a lithium-ion battery, since the coating also reduces the amount of conductive additive needed to make a working anode. Since nickel silicide by itself lithiates reversibly, a combination of pure nickel silicide on silicon constitutes an anode material with both excellent electrical conductivity and excellent lithium cycling ability. The addition of fewer additives in the electrode also improves the specific energy density of the electrode since it has a lower amount of inactive material in the electrode.

The uniform metal-semiconductor alloy coatings of the present invention also provide uniformly high electrical conductivity thereby improving the ability to lithiate the anode material surface uniformly, which in turn causes uniform expansion of the anode material and subsequently less capacity degradation due to exfoliation. Metal deposition and metal-semiconductor alloy formation according to embodiments of the present invention are not dependant on the crystal orientation of the anode material.

For anodes in nonaqueous electrolyte secondary batteries, the present method is superior to other methods of making metal-semiconductor alloy coatings due to its selectivity, uniformity, and the improved electrical conductivity of the resultant material. These beneficial properties result in anode materials for nonaqueous electrolyte secondary batteries that provide longer cycle life, more uniform charge/discharge, higher rate capability, and higher specific energy density than currently used anode materials.

The present invention is directed to a method for forming an anode material having a metal-semiconductor alloy layer. The method comprises obtaining an anode material comprising a semiconductor; preparing a displacement solution comprising ions of a metal and a dissolution component for dissolving part of the semiconductor in the anode material; contacting a portion of the anode material with the displacement solution, wherein the portion of the anode material contains the semiconductor; dissolving a part of the semiconductor from the portion of anode material; reducing the ions of the metal to the metal by electrons provided by the dissolution of the semiconductor; depositing the metal on the portion of the anode material; and annealing the portion of the anode material and the deposited metal to form a metal-semiconductor alloy layer.

In a method of the present invention, an anode material having a uniform metal-semiconductor alloy layer is formed. An anode material comprising a semiconductor is prepared and a displacement solution comprising ions of a metal and a dissolution component for dissolving semiconductor material in the anode material is prepared. Then, a portion of the anode material that contains the semiconductor is contacted with the displacement solution. Some of the semiconductor from the portion of anode material contacted with the displacement solution dissolves in the displacement solution. The dissolution of the semiconductor reduces ions of the metal in the displacement solution to the metal. The metal deposits out of the solution onto the portion of the anode material. The portion of the anode material and the deposited metal are then annealed to convert the deposited metal to metal-semiconductor alloy.

The specific example of nickel and silicon is used in the following embodiment. However, the processes of the present invention can be used to deposit many other metals such as other base metals like copper and cobalt or noble metals like silver, gold, platinum, palladium, or rhodium. Preferably the displacement solution contains ions of primarily one metal, but the displacement solution can contain ions of multiple metals. The anode material can contain semiconductors such as silicon or germanium or alloys of semiconductor materials such as silicon or germanium alloys with tin, zinc and manganese. The semiconductor in the anode material can be a compound semiconductor like a III-V compound such as aluminum antimonide (AlSb), indium antimonide (InSb), gallium arsenide (GaAs), and indium phosphide (InP); or a II-VI compound such as cadmium telluride (CdTe), and cadmium-selenide (CdSe).

In the example of nickel deposition on a silicon-containing anode material, the nickel ions can be supplied to the displacement solution by adding a nickel-containing salt, such as nickel sulfate or nickel chloride and the dissolution component can be a hydrolyzed fluoride ion, such as ammonium fluoride or hydrofluoric acid. The base material, in this case silicon, dissolves in the solution providing the electrons for the deposition of the nickel. Silicon at the surface of the anode material dissolves into solution. Nickel ions reduce on the surface of the silicon-containing anode material to deposit a metallic nickel film that is subsequently converted into nickel silicide by annealing. Since this process requires the dissolution of silicon for the deposition of nickel, the deposition occurs only on the sites where the silicon can dissolve. As a result, the film that is deposited on the silicon surface is extremely uniform, unlike in an electroless or electro-deposition process. Since it also involves the displacement of silicon atoms for the deposition of a nickel atom, the adhesion of the metal coating on silicon through this process is superior to an electroless deposition process.

Figure 2:
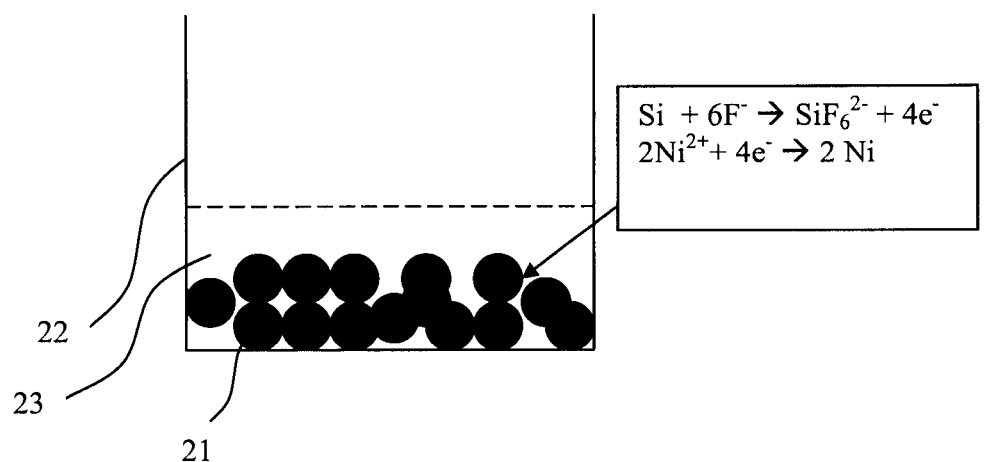
FIG. 2 is an illustration of the displacement process of an exemplary embodiment of the present invention.

Contact between the displacement solution and a portion of the anode material can be accomplished by various means including partial and complete immersion, coating and spraying. FIG. 2 is a schematic of a displacement process in which the anode material 21 is immersed in a container 22 that contains the displacement solution 23. As shown, the anode material 21 can be in particle form. The anode material 21 can also be monolithic and have a uniform or non-uniform shape and can be made of multiple parts. In FIG. 2, the anode material is submerged in the displacement solution 23. However, a portion of the anode material 21 may be contacted with the displacement solution 23. The displacement solution 23 contains the required amount of the salt of the metal to be deposited along with an appropriate concentration of the dissolution component. The solution 23 can be kept within a set temperature range for a specified length of time in the container 22 for the metal displacement to occur. When the desired thickness of the metal is achieved, the anode material is removed from the solution to be rinsed, dried, and annealed.

In one example of this process, the average thickness of metal deposited by this method on anode materials can be between about 100 nanometers and 3 micrometers. In an example of this process, metal layers deposited on anode materials by this process can have thickness non-uniformities of less than about 25%. Thickness non-uniformity is defined as the quantity of the maximum thickness minus the minimum thickness, divided by the average thickness. The term about as used herein means plus or minus 15% of the specified value. The above steps of the deposition process can also be repeated in cases where thicker metal-semiconductor alloy layers are necessary.

Annealing can be performed in an inert atmosphere to form a uniform metal-semiconductor alloy coating. For example, if the annealing atmosphere in the nickel-on-silicon example contains too much oxygen, the deposited nickel can be converted to nickel oxide instead of nickel silicide in the annealing step. Annealing conditions for obtaining a nickel silicide layer of good conductivity and good alloy uniformity are disclosed in Waidmann et. Al., Microelectronic Engineering; Volume 83, Issue 11-12, Pages 2282-2286. In one example, annealing can be done using a rapid thermal anneal process at temperatures of about 500° C. Different annealing conditions provide silicides of varying conductivities due to the formation of different alloy compositions. The annealing conditions can be tailored for the resultant specific conductivities by changing the temperature and time of anneal.

In certain cases, such as when the annealing cycle needs to be short due to process time constraints, the annealing conditions can be designed such that not all the deposited metal gets converted to a metal-semiconductor alloy. Excess metal can impede lithiation of the metal-semiconductor alloy and semiconductor material. In such a scenario, the excess metal that is not converted to metal-semiconductor alloy can be etched off using a solution that selectively etches the metal without etching the metal-semiconductor alloy. For example, a solution of sulfuric acid in hydrogen peroxide can selectively etch nickel without etching nickel silicide.

In one embodiment of the method of the present invention, the displacement solution contains about 0.02-0.5 M $Ni^{2+}$ as nickel sulfate in solution; contains about 0.5-5 M fluoride as $NH_4F$ in solution; has a pH of about 8-10; and has a temperature of about at 50° C.-98° C.

In another embodiment of the method of the present invention, the displacement solution contains about 0.02-0.5 M $Ni^{2+}$ as nickel sulfate in solution; contains about 0.5-5 M peroxide as $H_2O_2$ in solution; has a pH of about 8-10; and has a temperature of about at 50° C.-98° C.

The methods of the present invention can be used to prepare an anode material having a uniform metal-semiconductor alloy layer. The metal-semiconductor alloy layer on an anode prepared by the methods of this claim is preferably a nickel silicide. Other metals may also be used on anodes prepared by the methods of this invention including other base metals like copper and cobalt or noble metals like silver, gold, platinum, palladium, or rhodium. Preferably, the thickness of the metal-semiconductor alloy on an anode prepared by the methods of the present invention is between about 100 nanometers and 3 micrometers. Preferably, the thickness non-uniformity of the metal-semiconductor alloy on an anode prepared by the methods of the present invention is less than about 25%.

A nonaqueous electrolyte secondary battery can be made using an anode prepared by the methods of the present invention. A battery is formed using the anodes of the present invention by combining them with cathodes and electrolytes in planar or three dimensional structures as known in the art. See, e.g., Long et. al., *Three-Dimensional Battery Architectures*, Chemical Reviews, 2004, 104, 4463-4492. The nonaqueous electrolyte secondary battery of the present invention can be a lithium-ion battery, a sodium-ion battery, a potassium-ion battery, or another type of nonaqueous electrolyte secondary battery.

The following examples further illustrate the present invention. These examples are intended merely to be illustrative of the present invention and are not to be construed as being limiting.

EXAMPLES

Example 1

Immersion Nickel Deposition on Particulate Anode Material

A sample of 2 grams of silicon particulates in powder form (−325 mesh) was immersed for 30 seconds in 50 milliliters of a solution containing 0.1 M $NiSO_4.6H_2O$ and 5M $NH_4F$. The pH of the solution was maintained at 8.5 and the operating temperature was 85° C. Deposition was done with the powder on top of a filter paper assembled in a Buchner funnel. Vigorous bubbles were observed during deposition indicating the nickel displacement reaction. The solution was drained out through the application of vacuum in the Buchner funnel. The sample was rinsed with DI water for 10 minutes to remove trace salt contamination. The powder was harvested and dried at 80° C. in air for 12 hours. Subsequently, the powder was annealed for 2 hours (including heat and cool time) to a maximum temperature of 550° C. in a $H_2/N_2$ atmosphere to form the silicide.

The resulting anode material was reversibly cycled upwards of 1200 mAh/g of silicon equivalent for 100 cycles at an average coulombic efficiency of 99.8% for the 100 cycles. This was in contrast to a silicon powder alone which degraded to less than 330 mAh/g capacity of silicon by the 10th charge-discharge cycle.

Example 2

Immersion Nickel Deposition on Particulate Anode Material

The process of Example 1 was carried out on particulate silicon in powder form (−325 mesh). The sample prepared was immersed in a solution of 10 ml $H_2SO_4$+40 milliliters 3% $H_2O_2$ at 70° C. for 3 minutes to remove any excess nickel and to leave behind the silicide.

Although the invention has been described with reference to the presently preferred embodiments, it should be understood that various modifications could be made without departing from the scope of the invention.

What is claimed is:

1. A composite anode for a secondary battery, the composite anode comprising a matrix comprising a binder and a particulate anode material bound together by the binder, the particulate anode material comprising a semiconductor material having a surface and a semiconductor alloy layer completely coating the semiconductor material surface, the semiconductor material comprising silicon, germanium, a III-V compound semiconductor or a II-VI compound semiconductor, the semiconductor alloy layer comprising an alloy of the semiconductor material and a metal selected from nickel, copper, cobalt, silver, gold, platinum, palladium and rhodium, the semiconductor alloy layer having a thickness of about 100 nanometers to about 3 micrometers and a thickness non-uniformity of less than about 25% wherein thickness non-uniformity is defined as the quantity of the maximum thickness minus the minimum thickness, divided by the average thickness.

2. The composite anode of claim 1, wherein the metal is a noble metal.

3. The composite anode of claim 1, wherein the metal is a base metal.

4. The composite anode of claim 3, wherein the metal is nickel.

5. The composite anode of claim 1, wherein the semiconductor is silicon.

6. The composite anode of claim 1, wherein the metal is nickel and the semiconductor is silicon.

7. The composite anode of claim 1, comprising a metal-semiconductor layer wherein the average thickness of the metal-semiconductor alloy layer is between about 100 nanometers and 3 micrometers.

8. The composite anode of claim 1, comprising a metal-semiconductor layer wherein the thickness non-uniformity of the metal-semiconductor alloy layer is less than about 25%.

9. The composite anode of claim 1 wherein the semiconductor material contains silicon and the semiconductor alloy layer comprises an alloy of nickel or copper.

10. The composite anode of claim 9 wherein the semiconductor material contains silicon and the semiconductor alloy layer is a nickel silicide layer having a resistivity of 10-60 pa/cm.

11. The composite anode of claim 9 wherein the semiconductor alloy layer is a nickel silicide layer and the nickel silicide layer is formed by a process comprising the step of selectively etching the nickel silicide layer to remove excess nickel without etching the nickel silicide layer.

* * * * *